United States Patent [19]
Johnson

[11] Patent Number: 6,124,051
[45] Date of Patent: Sep. 26, 2000

[54] FUEL CELL STACK WITH NOVEL COOLING AND GAS DISTRIBUTION SYSTEMS

[75] Inventor: Mark C. Johnson, Phoenix, Ariz.

[73] Assignee: Phoenix Analysis and Design Technologies, Gilbert, Ariz.

[21] Appl. No.: 09/191,806

[22] Filed: Nov. 13, 1998

[51] Int. Cl.[7] .................................................. H01M 8/24
[52] U.S. Cl. .............................. 429/26; 429/27; 429/32; 429/34; 429/35; 429/37; 429/38; 429/39
[58] Field of Search .................................. 429/26, 27, 34, 429/35, 37, 38, 39, 32

[56] References Cited

U.S. PATENT DOCUMENTS

| | | |
|---|---|---|
| 3,468,712 | 9/1966 | Gillespie . |
| 4,124,478 | 11/1978 | Tsien et al. . |
| 4,214,969 | 6/1980 | Lawrence . |
| 4,444,851 | 4/1984 | Maru . |
| 4,826,741 | 2/1989 | Aldhart et al. . |
| 5,252,410 | 10/1993 | Wilkinson et al. . |
| 5,262,249 | 11/1993 | Beal et al. . |
| 5,419,980 | 11/1993 | Okamoto et al. . |
| 5,773,160 | 6/1998 | Wilkinson et al. ........................ 429/26 |
| 5,804,326 | 9/1998 | Chow et al. ............................... 429/39 |

*Primary Examiner*—Bruce F. Bell
*Attorney, Agent, or Firm*—James L. Farmer

[57] ABSTRACT

An electrochemical fuel cell stack is provided for converting a fuel reactant stream and an oxidant stream to a reaction product, heat, and electrical energy. The fuel cell stack includes manifolding endplates with a plurality of unit cells therebetween, each unit cell incorporating a smooth conductive cooling layer, and anode and cathode layers incorporating gas distribution layers formed of a central, porous, sheet material and a peripheral gasket material. The cooling layer conducts heat from distant regions of the unit cell to longitudinal cooling passages which run through the length of the stack defining a serial path through turnaround grooves in the faceplate and endplate. There is further provided a method for introducing reactant gases to the gas distribution layers. Longitudinal passages carry reactants the length of the stack and distribute gas through porous bridges to a lateral distribution channels formed along sides of the gas distribution layers, and through the gas distribution layers to exhaust. The layers of the unit cell are all relatively smooth and devoid of cooling channels.

42 Claims, 10 Drawing Sheets

FUEL CELL STACK WITH NOVEL COOLING AND GAS DISTRIBUTION SYSTEMS

TECHNICAL FIELD

The present invention relates in general to fuel cells, and more particularly to proton exchange membrane fuel cells.

BACKGROUND ART AND TECHNICAL PROBLEMS

There are already known various constructions of fuel cells, among them such employing a proton exchange membrane confined between respective cathode and anode electrode plates. In such fuel cells, a gaseous fuel and an oxidizing gas are supplied to the anode electrode plate and to the cathodes electrode plate, respectively, and distributed as uniformly as possible over the active surfaces of the respective electrode plates (that is, the electrode plate surfaces facing the proton exchange membrane, each of which is usually provided with a layer of catalyst). Further, an electrochemical reaction takes place at and between such electrode plates, with attendant formation of a product of the reaction between the fuel and oxygen (product water), release of thermal energy, creation of an electrical potential difference between the electrode plates, with the thus generated electric power usually constituting the useful output of the fuel cell.

In the prior art proton exchange membrane fuel cells, each of the electrode plates typically has an associated electrically conductive backing plate having a relatively substantial thickness. Typically, each of these backing plates has a plurality of flow passages or grooves in the surface facing the electrode plate which carries the respective fuel or oxidant over the surface of the respective electrode, namely, the anode on the fuel side and the cathode on the oxidant side. Grooves in the backing plates also provide a means of supplying coolant over the central region of the unit cell. In conventional designs, the interior coolant channels are generally formed by the cooperating surfaces of two backing or separator plates, one of which contains grooves engraved, milled or molded in its surface and the other of which is planar. The coolant channels are located at periodic intervals along the stack. The backing plates are electrically coupled in series to provide a path for conducting electrons between electrodes.

Unit cells are thus constructed of the proton exchange membrane surrounded by electrodes which are further surrounded by the aforementioned grooved backing plates. Two or more unit fuel cells can be connected in series or in parallel to increase the overall power output of the assembly. In such arrangements the cells are typically connected in series such that the anode backing plate of one unit cell abuts the cathode backing plate of the adjacent unit cell. Such assemblies are referred to as fuel cell stacks. An example of a prior art fuel cell stack is disclosed in U.S. Pat. No. 5,252,410.

Unfortunately, the use of grooved backing plates leads to thick unit cells and low cell area densities. Cell area density (CAD) is defined as the square meters of active cell area per kilogram of stack weight. Cell area density is directly related to stack power density but is independent of operating condition. Accordingly, an object of the present invention is to increase the cell area density of a fuel cell stack.

The viability of prior art fuel cell stacks has also suffered due to performance issues involving inadequate removal of product water. Inadequate water removal leads to poor oxygen transport to active catalyst sites on the cathode which then lead to low cell voltage. Consequently, it is an additional objective of the present invention to provide a design which insures that excessive product water does not collect on the cathode.

It is yet another objective of the present invention to design the fuel cell stack of the above type in such a manner as to be relatively simple in construction, inexpensive to manufacture, easy to use, easy to maintain, and yet reliable to operate.

SUMMARY OF THE INVENTION

The foregoing objectives and advantages are achieved by an electrochemical fuel cell stack for converting a fuel reactant stream and an oxidant reactant stream to a reaction product stream, heat, and electrical energy. The fuel cell stack comprises front oxidant manifolding face plate, associated bolts, a coolant turnaround bus plate, a multitude of novel unit cells, a second bus plate, and a coolant manifolding endplate. The stack provides a multitude of longitudinal oxidant passages which deliver oxidant to each unit cell along the stack. The manifolding face plate employs grooves to supply all of the longitudinal oxidant inlet passages from a single inlet port. Furthermore, the manifolding face plate employs grooves to collect oxidant from all of the longitudinal oxidant outlet passages to a single port. Similarly, the coolant manifolding endplate supplies and collects coolant to or from longitudinal coolant passages respectively. Both the face plate and the endplate are ribbed and crowned to provide even sealing pressure with the absolute lightest plates possible. The longitudinal coolant passages are interposed in relatively close proximity to the oxidant inlet longitudinal passages.

The novel unit cells comprise a thin, thermally conductive cooling plate, a cathode electrode/gasket plate, an ion exchange membrane, and an anode electrode/gasket plate. The cathode electrode/gasket layer provides at least one inlet and at least one outlet for porting oxidant to or from the longitudinal oxidant passages. The anode electrode/gasket layer provides at least one inlet and at least one outlet for porting fuel to or from the longitudinal fuel passages. Lateral reactant distribution channels are formed in the anode and cathode electrode/gasket layers by cooperation between gasket material, electrode material, cooling material, and ion exchange membrane material. These lateral reactant distribution channels insure even supply and collection of reactants to the edges of electrodes. Reactants are forced laterally through the electrode material, by means of a pressure drop, from a supply reactant channel to a collection reactant channel.

BRIEF DESCRIPTION OF THE DRAWING FIGURES

The present invention will hereinafter be described in conjunction with the appended drawing figures, wherein like numerals denote like elements, and.

DETAILED DESCRIPTION OF THE PREFERRED EMBODIMENT

Figure 1:
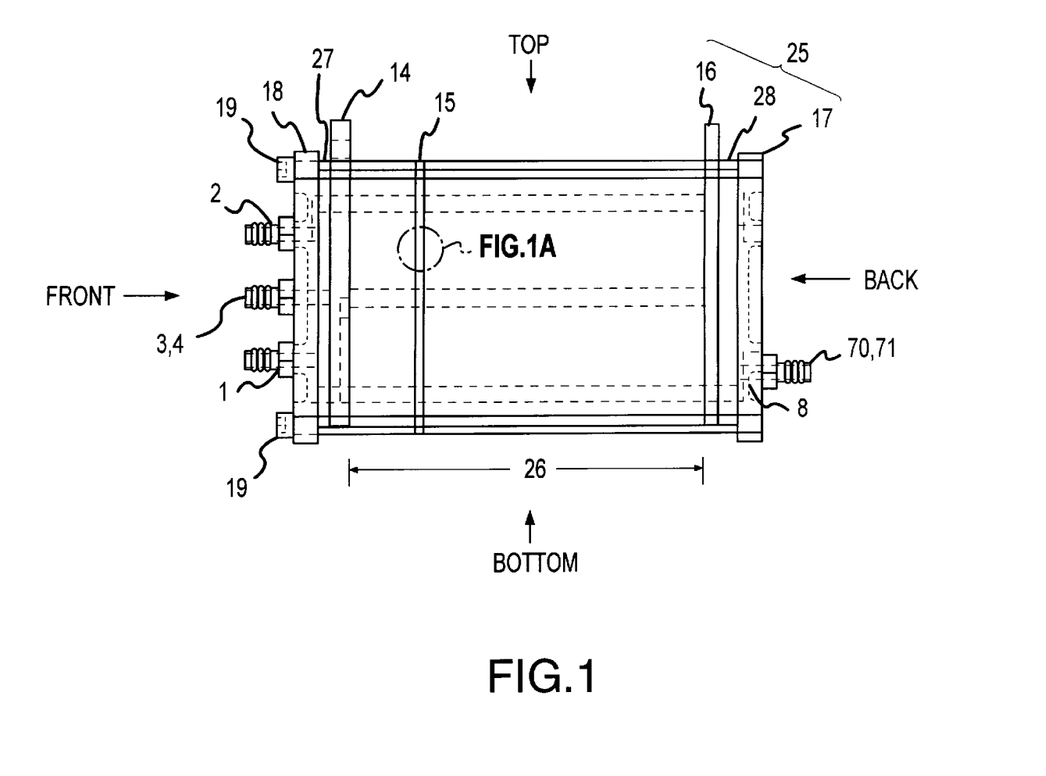
FIGS. 1 and 1A are a side plan view of a fuel cell stack assembly in accordance with the principles of the present invention.
Figure 1A:
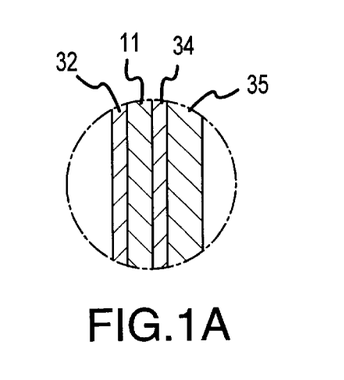

Referring to FIG. 1 an exemplary modular fuel cell stack assembly 25 is depicted. Fuel cell stack assembly 25 includes generally an electrochemically active section 26, a pair of bus plates 14, and 16, a pair of sealing plates 27, and 28, a compression face plate 18, and a compression endplate 17. The active section 26 includes a plurality of repeating unit cells 15 disposed in series relationship to one another, for providing a voltage to the bus plates 14 and 16. Each unit cell contains four layers (see FIG. 1A): a thin, thermally conductive layer 32; a cathode electrode/gasket layer 11, an ion exchange membrane 34, and an anode electrode/gasket layer 35. The repeating units 15 are electrically coupled in series by virtue of the contact between the thermally conductive layer 32 and the electrode layers of adjacent cells. The active section 26 forms the main central portion of stack 25, with the bus plates 16 and 14 located on opposite ends thereof, and the faceplate 18 and endplate 17 outboard of the buss plates. Tie bolts 19 span the entire length of stack 25, and are used together with the plates 17 and 18 to clamp the assembly 25 together to form a sealed unit. The plates 17 and 18 also provide fluid and gas access to the active section 26.

The fuel cell stack is preferably rectangular in shape when viewed from the front, the top, or from the side as depicted in FIG. 1. The fuel cell has a longitudinal dimension, a width, and a height. The longitudinal direction is from the front to the back, (or left to right with respect to the view of FIG. 1); height is measured from the bottom to the top (also bottom to top with respect to FIG. 1); and width measured into and out of the plane of FIG. 1. As shown in FIG. 1, the fuel cell is preferably longer than it is high. Importantly, the fuel cell is also preferably substantially wider than it is long, as can be seen by temporarily referring to FIG. 3 which faces the bottom side of the fuel cell. It should be noted that the use herein of terms such as top, bottom, front, height, etc., is for purposes of providing relative reference only, and not intended to suggest any limitations on how the fuel cell 25 may be positioned or mounted in a particular application.

Figures 2, 2A:
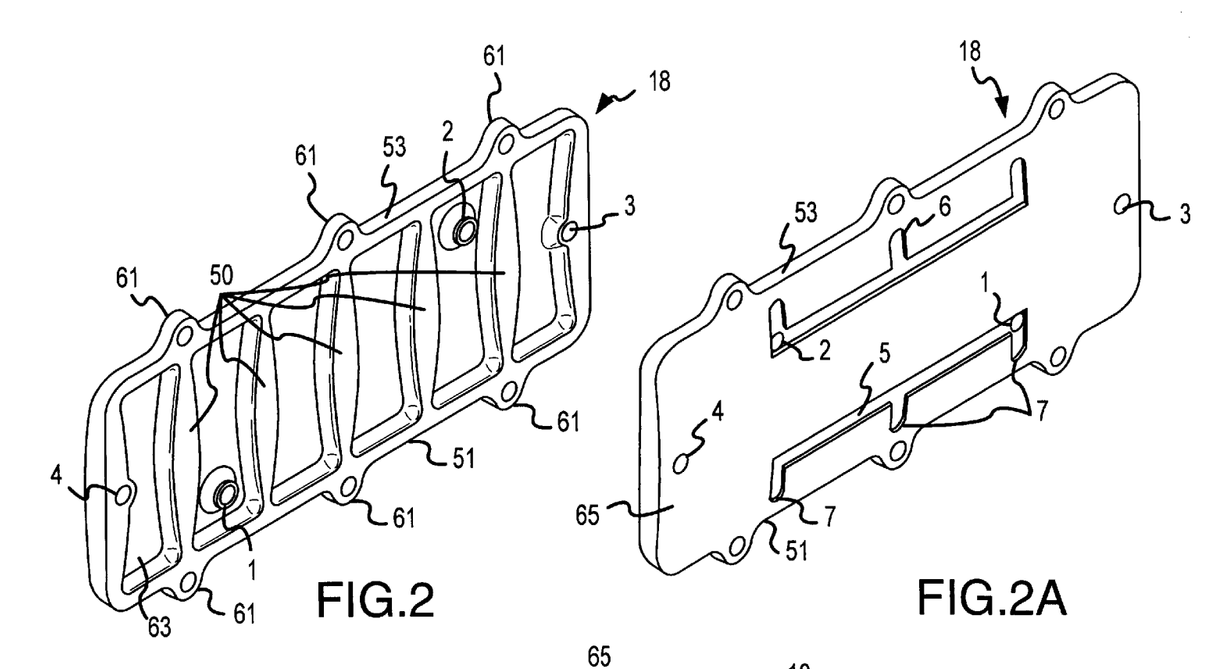
FIG. 2 is a perspective view of the manifolding faceplate of the fuel cell stack assembly of FIG. 1.
FIG. 2A is another perspective view of the manifolding face plate of FIG. 1.
Figure 2B:
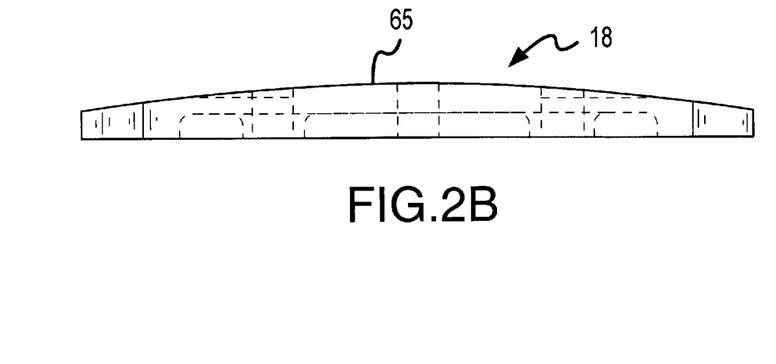
FIG. 2B is an end plan view of the manifolding face plate FIG. 1.

Now referring to FIGS. 2, 2a, and 2b, a preferred compression faceplate 18 in accordance with the present invention is presented. Faceplate 18 is generally rectangular in shape, having opposing long edges 51 and 53, and outer and inner surfaces 63 and 65. As part of stack assembly 25, faceplate 18 is oriented such that the inner surface 65 faces the active section 26. The outer surface 63 includes oxidant gas inlet and outlet ports 1 and 2, and fuel gas inlet and outlet ports 3 and 4. Oxidant inlet port 1 extends through the compression faceplate 18 to provide fluid connection with an inlet manifolding groove 5 formed in inner surface 65 of plate 18 near lower long edge 51. Similarly, the oxidant outlet port 2 provides fluid connection with an outlet manifolding groove 6 formed in inner surface 65 near the upper long edge 53. The manifolding grooves 5, and 6 provide fluid access to an array of oxidant gas passages within stack 25 (described further below), which serve to distribute oxidant gas into and out of the active section 26. A seal plate 27 is disposed between the compression face plate 18 and the first bus plate 14 to prevent gas from leaking out of manifolding grooves 5 and 6. Fuel inlet and outlet ports 3, and 4 similarly provide fluid access to fuel distribution passages in stack 25 for distributing and recovering fuel gas.

The outer surface 63 of faceplate 18 includes a number of integral stiffening ribs 50. The ribs 50 extend substantially between long edges 51 and 53, and are preferably wider in the middle than at the ends. Although five ribs 50 are shown, more or less ribs may be effectively used depending on, among other things, the longitudinal width of the cell, the face plate material, and the thickness of the stack assembly 25. The inner surface 65 of faceplate 18 may be contoured to improve distribution of the clamping load from tie bolts 19. A slightly crowned shape is preferred, as shown best in FIG. 2B which views a short edge of faceplate 18. As will be appreciated by one skilled in the art, the optimal contoured shape of surface 65 is highly dependent upon similar factors to those noted above in reference to the stiffening ribs, and thus is best uniquely determined for each fuel cell design.

Flanges 61 are provided on edges 51 and 53 for accepting tie bolts 19. The tie bolts 19 are used to clamp the entire assembly 25 together. As shown, tie bolts 19 extend from flanges 61 on faceplate 18 to cooperatively positioned flanges 61 on end plate 17, thus spanning the entire length of stack 25. Tie bolts 19 preferably have a bolt head at one end to abut flanges 61 of faceplate 18, and threads on the opposite end for engaging threaded holes in flanges 61 of endplate 17. Thus as bolts 19 are tightened, the endplate 17 is drawn toward faceplate 18, to thereby compress together the rest of stack 25 therebetween. Preferably there are least three flanges 61 on each edge of plates 17 and 18, however a greater or lesser number may be used. In an alternative embodiment of the invention, a metal strap (not shown) is wrapped around the entire stack including plates 17 and 18, and tightened to compress the stack. With a strap arrangement, load spreading members disposed outboard of plates 17 and 18 may be beneficially incorporated to distribute the compression load applied by the strap more evenly to the stack.

Figure 5:
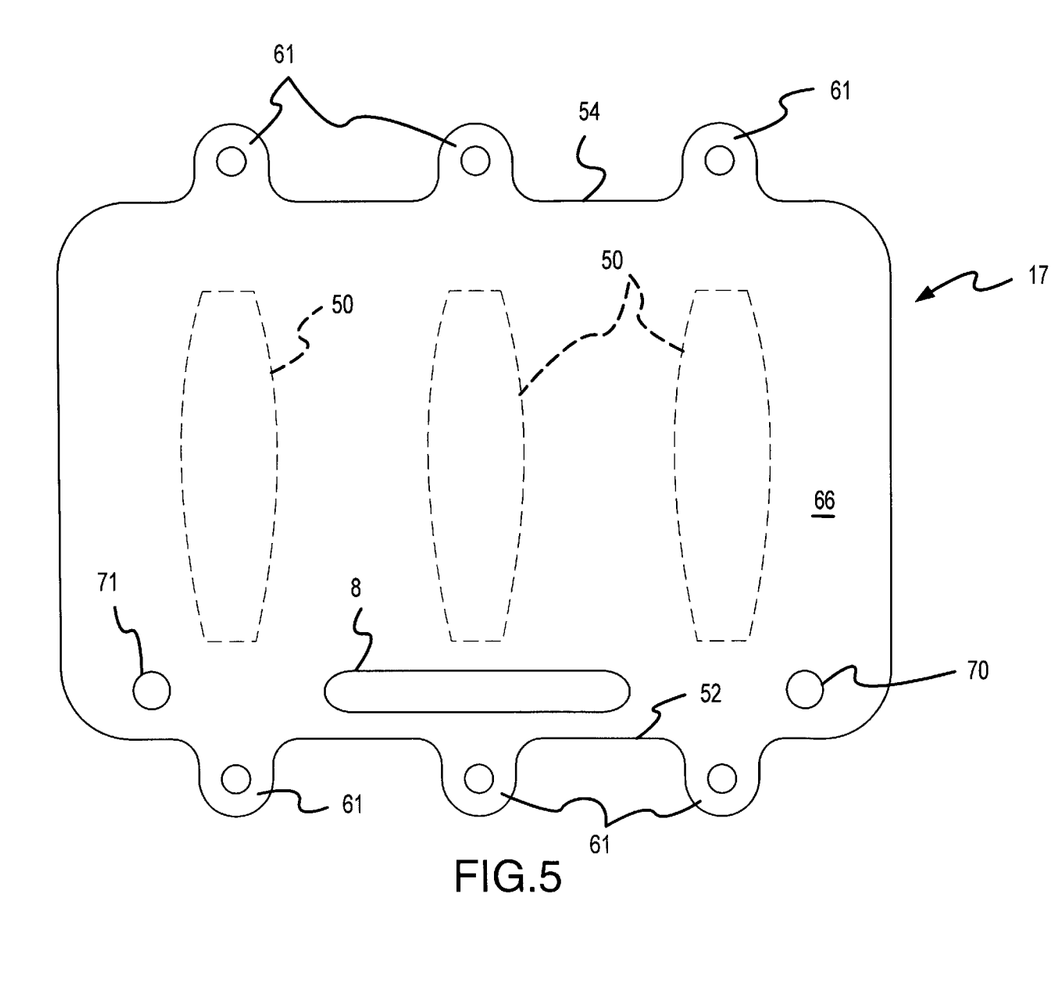
FIG. 5 is a front plan view of the turnaround endplate.

Referring now to FIG. 5, the endplate 17 is structurally a mirror image of faceplate 18, rectangular in shape with stiffening ribs 50 on an outer surface 64 extending between long edges 52 and 54, and a crowned inner surface 66 facing active section 26. Endplate 17 provides access for cooling fluid to the active section 26. Thus a coolant inlet port 70 and coolant outlet port 71 are provided for fluid connection to coolant passages internal to stack 25, as described in greater detail below. The compression endplate 17 is sealed against second bus plate 16 by a sealing plate 28.

Figure 3:
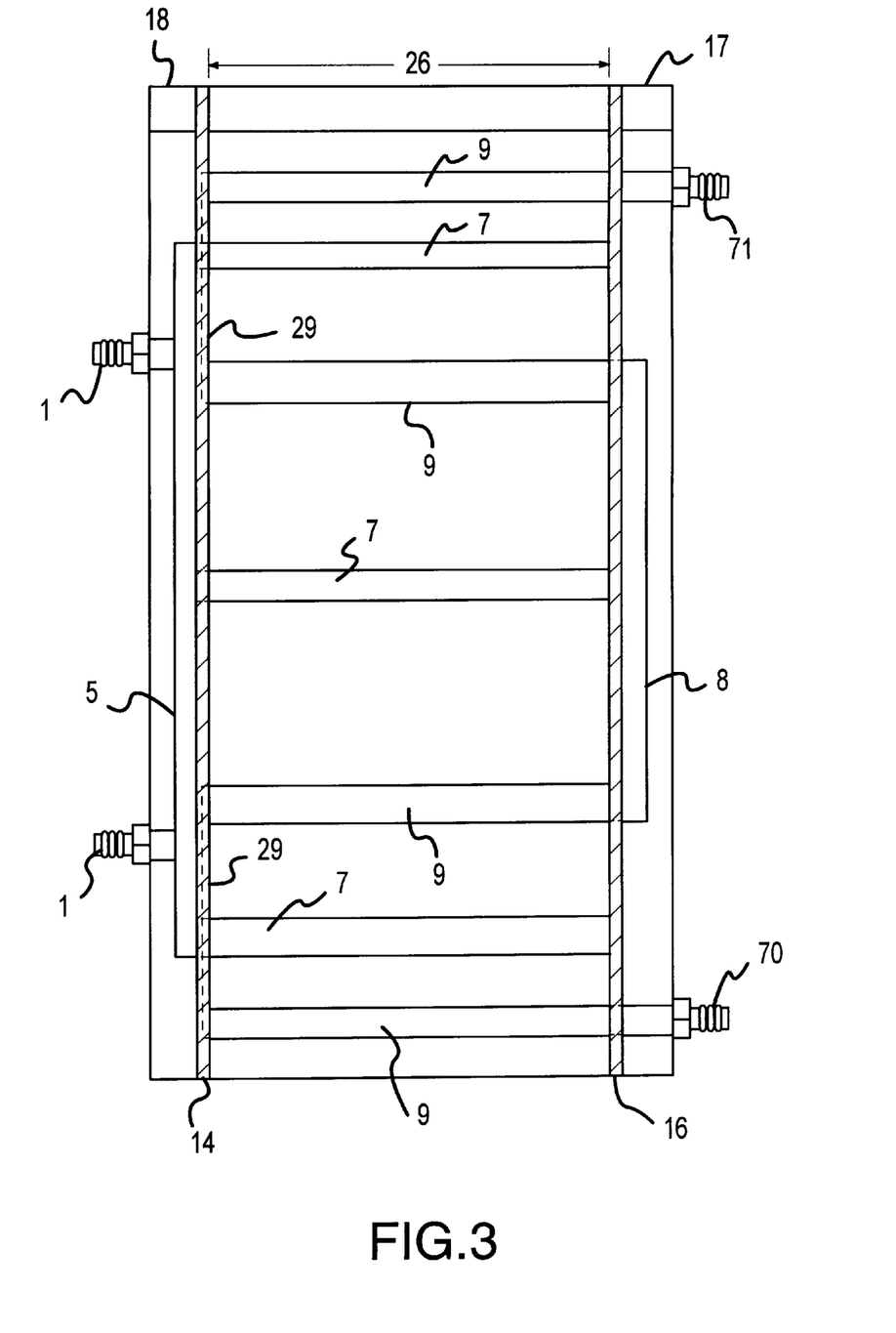
FIG. 3 is a fragmentary bottom view of the fuel cell stack of FIG. 1 revealing passages for coolant and reactant gas.

FIG. 3 shows a cut-away view of the bottom side of the fuel cell stack assembly 25, revealing three longitudinal inlet oxidant passages 7 (more or less oxidant passages could be employed). The inlet oxidant passages 7 are formed by cooperatively aligning holes formed in the sealing plate 27, the first bus plate 14, and all of the unit cells 15. The inlet passages 7 extend from the oxidant inlet manifold 5 on inner surface 65 of face plate 18, through the stack 25 along the bottom thereof, and terminate against the second buss plate 16. Thus oxidant gas is provided along the length of stack 25 to the unit cells 15 of active section 26. Similarly, exhaust oxidant passages 13 (see FIG. 4) extend from second buss plate 16 through aligning holes in stack 25 to the oxidant exhaust manifolding groove 6 formed on inner surface 65 of face plate 18. The oxidant exhaust passages 13 are disposed along the opposite side stack 25 from inlet passages 7 (along the top), for collecting oxidant gas exhaust products from active section 26. In this way an oxidant gas circuit is provided whereby oxidant gas flows through inlet port 1, inlet manifold 5, inlet passages 7, and then traverses across the active section 26 through the cathode layers 11 of unit cells 15 to exhaust passages 13, manifolding grooves 6, and outlet 2.

Continuing with FIG. 3, an array of four coolant passages 9 are shown in an interposed relationship with inlet oxidant passages 7 along the bottom of stack 25. The longitudinal coolant passages 9 are formed by cooperatively aligning holes in the compression endplate 17, the second bus plate 16, and all of the unit cells 15. Continuity of the coolant passages is provided by turnaround groove 8 formed on the inner surface 66 of endplate 17, and a pair of turnaround grooves 29 formed on the inner surface (facing the active section 26) of the first bus plate 14. Thus the coolant enters the stack at one location, inlet port 70 in endplate 17, and exits the stack at one location, outlet port 71 in endplate 17, while passing serially through coolant passages 9. Alternatively, a parallel connectivity for the coolant passages could constructed by altering the manifolding grooves cut into the first bus plate 14 and compression endplate 17. The coolant passages 9 are thus preferably disposed in between, and in the same plane of, the oxidant inlet passages 7 along the bottom side of stack 25. It will be appreciated that a larger or smaller number of interposed coolant and oxidant passages may be used depending upon the application.

Figure 4:
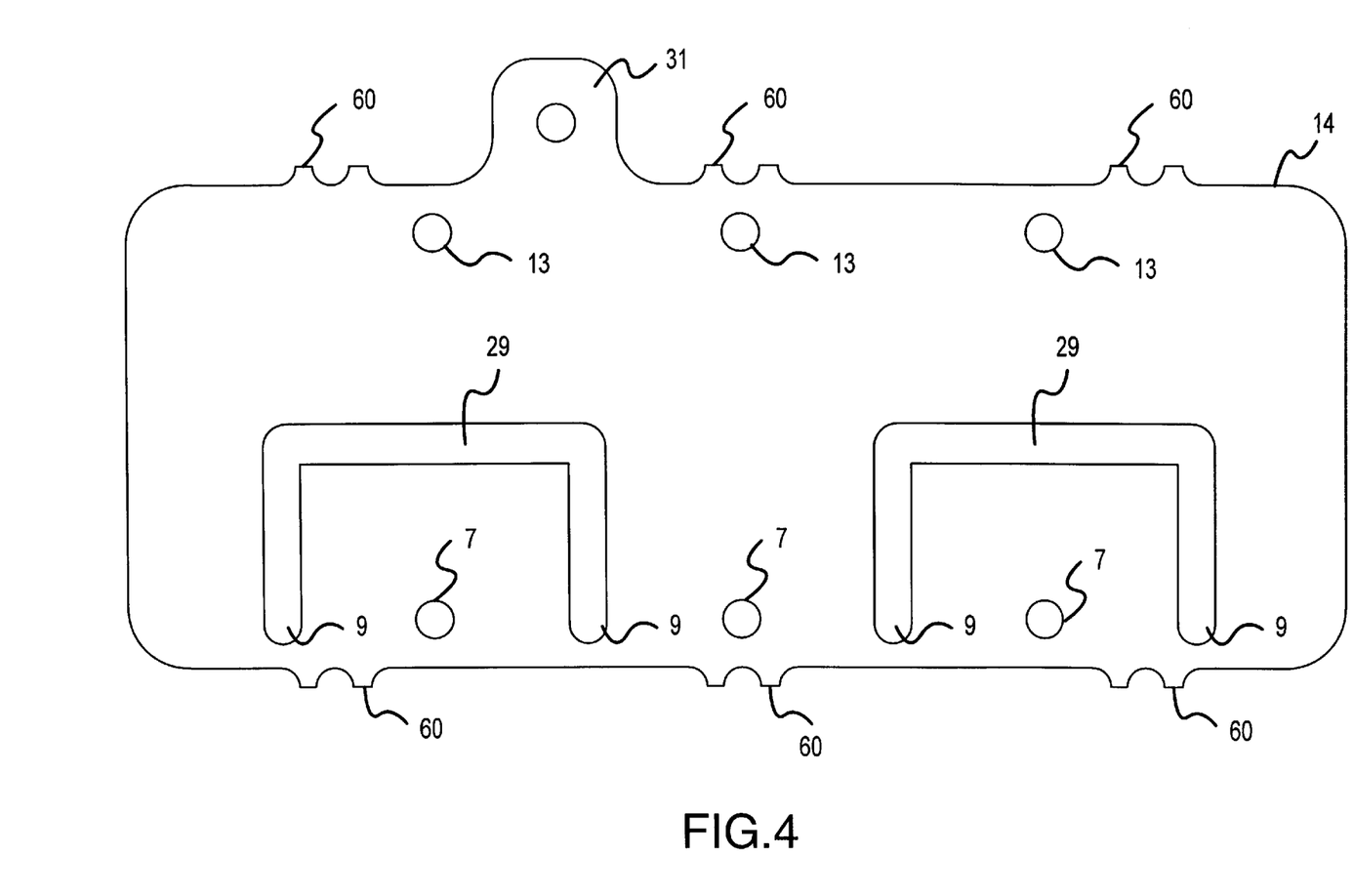
FIG. 4 is a back plan view of the turnaround bus plate.

Now referring to FIG. 4 the first bus plate 14 is shown in front view. The bus plate has a tab 31, which protrudes above the assembled stack 25 for providing an electrical connection to a load cable (not shown). As depicted in FIG. 4, the turnaround grooves 29 are formed in a U-shape, extending over and around the oxidant inlet passages 7. In this way, a pair of the longitudinal coolant passages 9 are connected to each other via turnaround groove 29 to redirect coolant back towards the compression endplate 17, while avoiding contact with longitudinal oxidant passages 7. Similarly, the turnaround 8 formed in compression endplate 17 (see FIG. 5) collects coolant from one longitudinal coolant passage 9, shunts the coolant over to the adjacent coolant passage 9, and directs the coolant forward towards the compression faceplate 18. As mentioned previously, the longitudinal oxidant inlet passages 7 terminate against bus plate 16. It should be noted that although the center passage 7 is shown aligned to potentially intersect with turnaround groove 8, bus plate 16 acts as a seal to separate the two conduits, preventing mixing of the oxidant gas and coolant fluid. Thus a coolant circuit is defined such that coolant entering at inlet 70 passes through a first passage 9, then through a first groove 29 in plate 14, then through a second passage 9, then through turnaround 8 in endplate 17, then through a third passage 9, then through a second groove 29 in plate 14, and last through a fourth passage 9 to outlet 71.

Bolt notches 60 are provided on the edges of bus plate 14 to seat the shanks of tie bolts 19 thereby aligning bus plate 14 to the stack 25. As can be seen by referring to FIGS. 6 and 7, bolt notches 60 are similarly provided on the edges of bus plate 16, and all of the cell layers of stack 25 as well. The use of bolt notches 60, instead of bolt holes or alignment pin holes, allows for easy horizontal stack assembly (instead of the customary vertical) and mid stack cell replacement.

Figure 6:
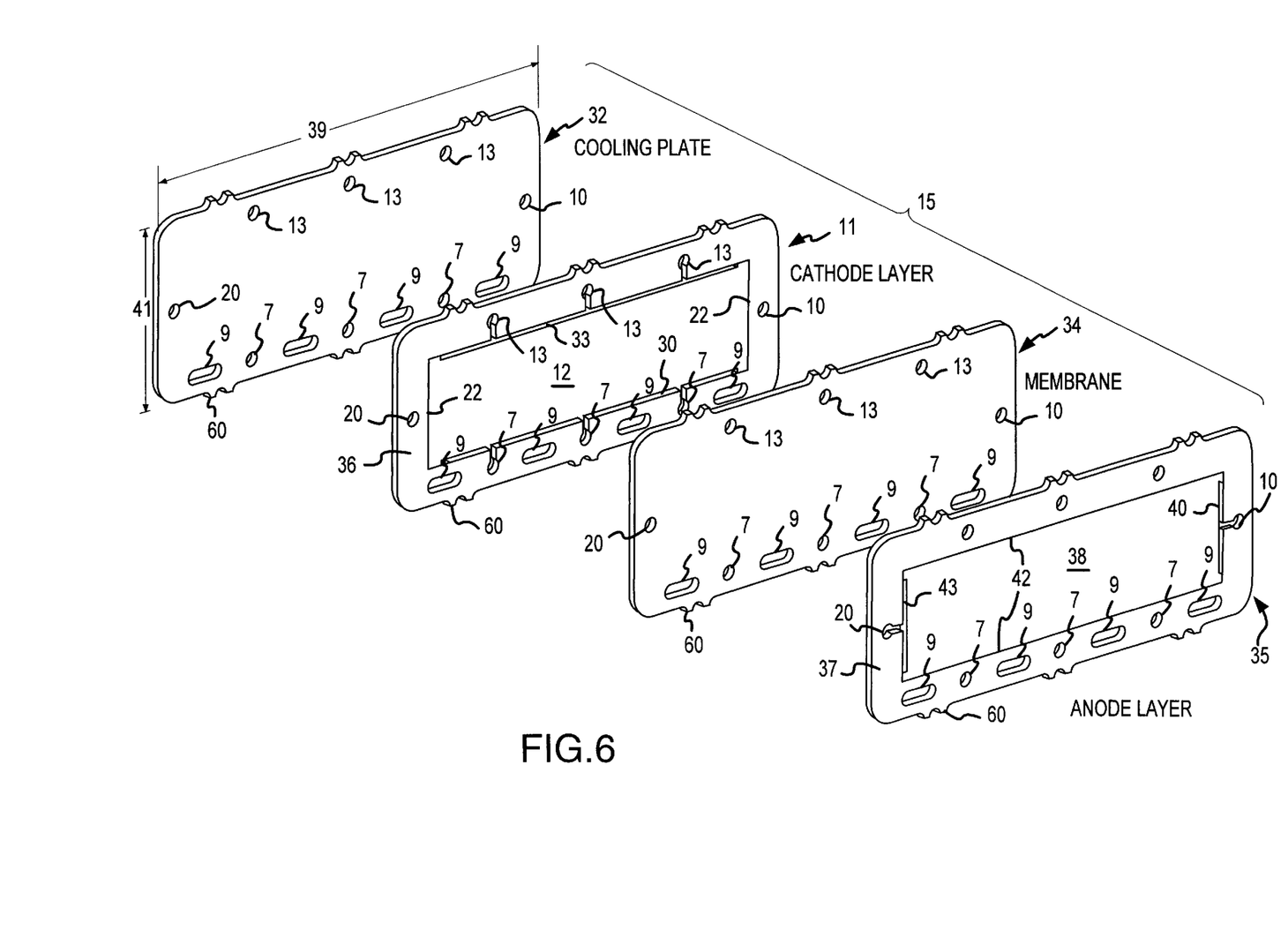
FIG. 6 is an exploded view of a unit cell of the fuel cell stack assembly of FIG. 1.
Figure 7:
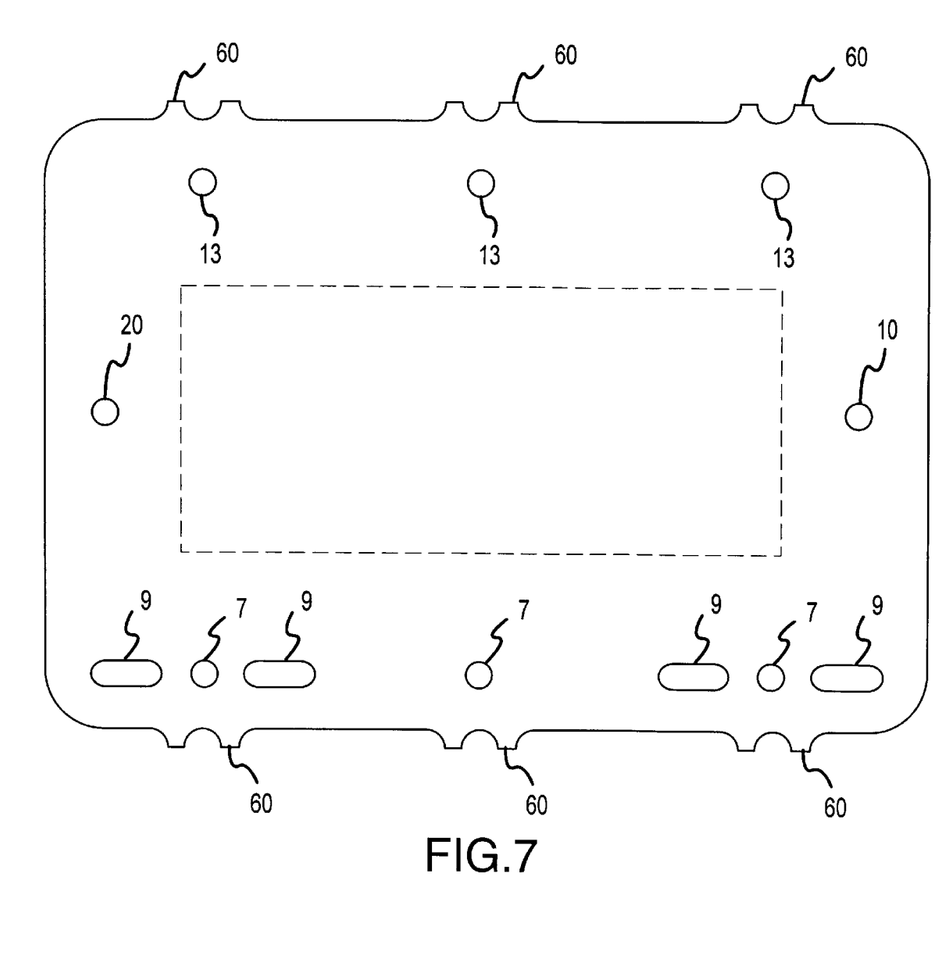
FIG. 7 is a front plan view of the thin cooling plate of the unit cell of FIG. 6.

Now turning to FIG. 6, a unit cell 15 contains four primary layers: a thermally and electrically conductive thin cooling plate 32; a cathode/gasket layer 11 which includes a gasket frame 36 and a porous, gas permeable electrode 12; an ion exchange membrane layer 34; and an anode/gasket layer 35 which includes a gasket frame 37 and a porous, gas permeable electrode 38. The unit cell 15 is substantially rectangular in shape and has a relatively long width 39 and a relatively short height 41 such that the cell aspect ratio, which is defined as the width 39 divided by the height 41, is large. Preferably the cell aspect ratio is at least 2. The unit cell 15 is preferably preconstructed in a modular manufacturing process with the aid of punching or stamping equipment. A multitude of unit cells 15 make up the fuel cell stack assembly 25. As previously mentioned, every individual layer of unit cells 15 includes bolt notches 60 to provide alignment of the unit cell 15 to the stack assembly 25.

Now referring to FIG. 6, a thermally conductive thin cooling plate 32 is the first plate in a repeating unit cell 15 and is used to provide a primary mechanism for removing waste heat generated due to the electrochemical reactions. Waste heat is primarily generated in the cathode/gasket layer 11 at the catalyst layer which is disposed between the ion exchange membrane 34 and the cathode porous electrode 12. Waste heat is absorbed by cooling plate 32, and conducted toward the coolant passages 9 near the bottom edge of the plate. As illustrated in FIG. 6, the longitudinal coolant passages 9 and the inlet longitudinal oxidant passages 7 are placed relatively close to each other and are in an alternating arrangement along the bottom edge of the plate 32. The cooling plate 32 is preferably made of a carbon based material, such as graphite or graphite foil. The thin cooling plate 32 also provides the finction of electron conduction and gas separation and therefore must be electrically conductive and substantially impermeable to reactant gases. Further, the thin cooling plate 32 provides at least one hole for fuel inlet and at least one hole for fuel outlet which cooperate with adjacent layers to form the longitudinal fuel inlet passage 10 and longitudinal outlet passage 20.

Figure 8:
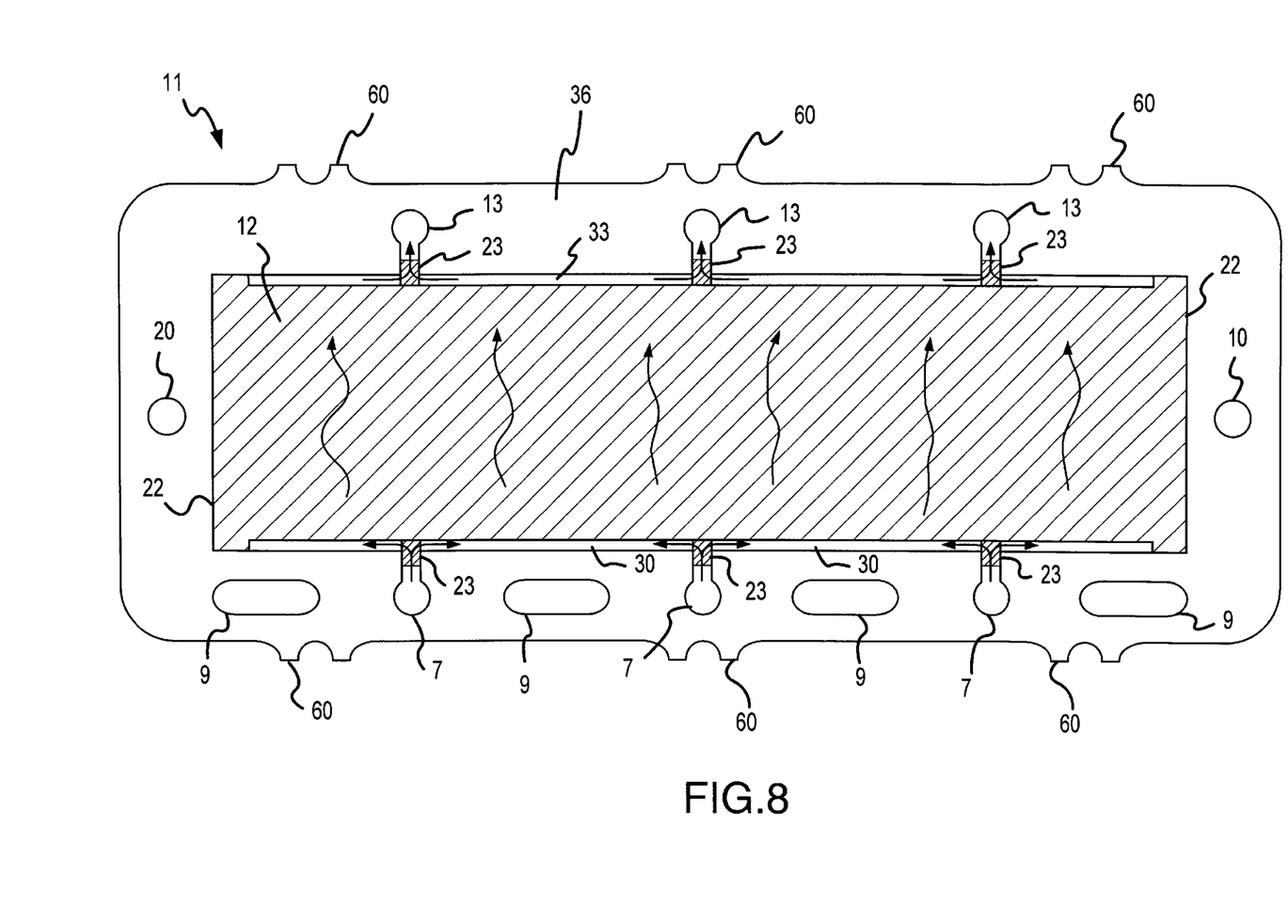
FIG. 8 is a side plan view of the cathode electrode/gasket layer of the unit cell of FIG. 6.
Figure 9:
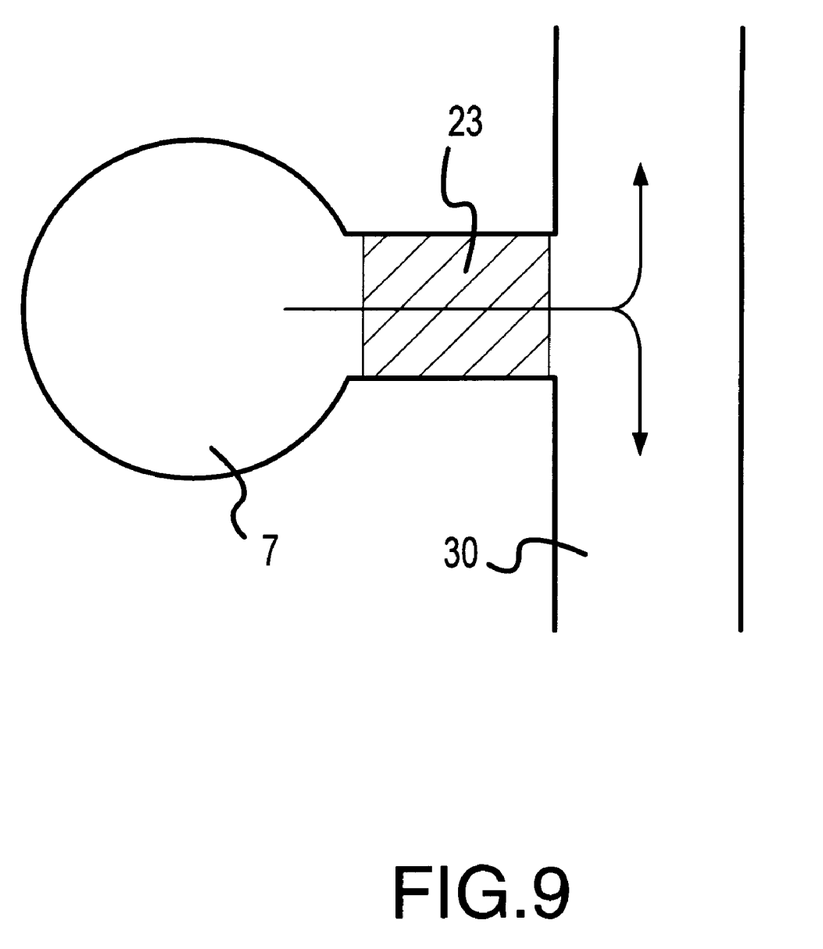
FIG. 9 is a plan view of the porous bridge portion of the electrode layers of the unit cell of FIG. 6.

Now turning to FIG. 8, a unit cell 15 contains a cathode/gasket layer 11, which comprises a gasket frame 36 and a porous cathode electrode plate 12. The bottom edge of porous cathode plate 12 is spaced apart from gasket frame 36 substantially the entire width of cathode plate 12, defining a lateral inlet oxidant distribution channel 30. The lateral distribution channel 30 is connected to the longitudinal inlet oxidant passages 7 by porous bridges 23 (as seen in FIG. 9), preferably of the same type material as porous plate 12. The gasket frame 36 is preferably slightly thicker than the porous cathode plate 12. Thus, the majority of the tie bolt clamp load is carried through the gasket frame 36, thereby minimizing any interlayer leakage of coolant fluid around coolant passages 9 and the longitudinal oxidant passages 7.

The cathode plate 11 is sandwiched between the adjacent non-porous thin cooling layer 32 and the ion exchange membrane 34. Thus, porous plate 12 is sealed on opposing faces by cooling layer 32 and membrane 34, and along its edges 22 by gasket layer 36, thereby constraining oxidant gas entering the inlet channel 30 to pass through the porous cathode plate along the short height of the cell. The thickness and porosity of the porous cathode plate 12 is chosen such as to cause a greater restriction to flow than the restriction of the lateral inlet oxidant distribution channel 30. Thus channel 30 completely fills with oxidant gas to uniformly distribute oxidant to the lower edge of cathode plate 12. The uniformity of the flow may be optimized by adjusting the porosity and thickness of the porous cathode electrode 12.

Similarly on the top edge of the cell, a lateral oxidant collection channel 33 is formed via cooperation between the gasket frame 36, the porous cathode plate 12, the thin cooling layer 32, and the ion exchange membrane 34. The lateral oxidant collection channel 33 delivers exhaust oxidant to exit porous bridges 23 which connect to longitudinal oxidant exhaust passages 13.

Now turning to FIG. 9, the porous bridges 23 connecting longitudinal oxidant inlet passages 7 to lateral oxidant distribution channel 30, are shown in greater detail. The porous bridges 23 minimize leakage due to deformation of the membrane 34. Without bridges 23, pressure on the fuel side of the membrane 34 can deform membrane 34 into the channel between passages 7 and the lateral distribution channel 30, thereby pulling away from the anode plate 35 located on the opposite side of membrane 34. Fuel can then leak directly to oxidant channels 7. The porous bridges support the membrane 34, preventing it from deforming into the oxidant channel. Also, the porous bridges 23 are substantially identical such that the flow restrictions caused by the porous bridges 23 are consistent, facilitating even oxidant distribution. In the preferred embodiment the porous bridges 23 are part of the porous cathode electrode 12. However, the bridges may be separate and of a different porosity than the cathode electrode 12 if required.

Figure 10:
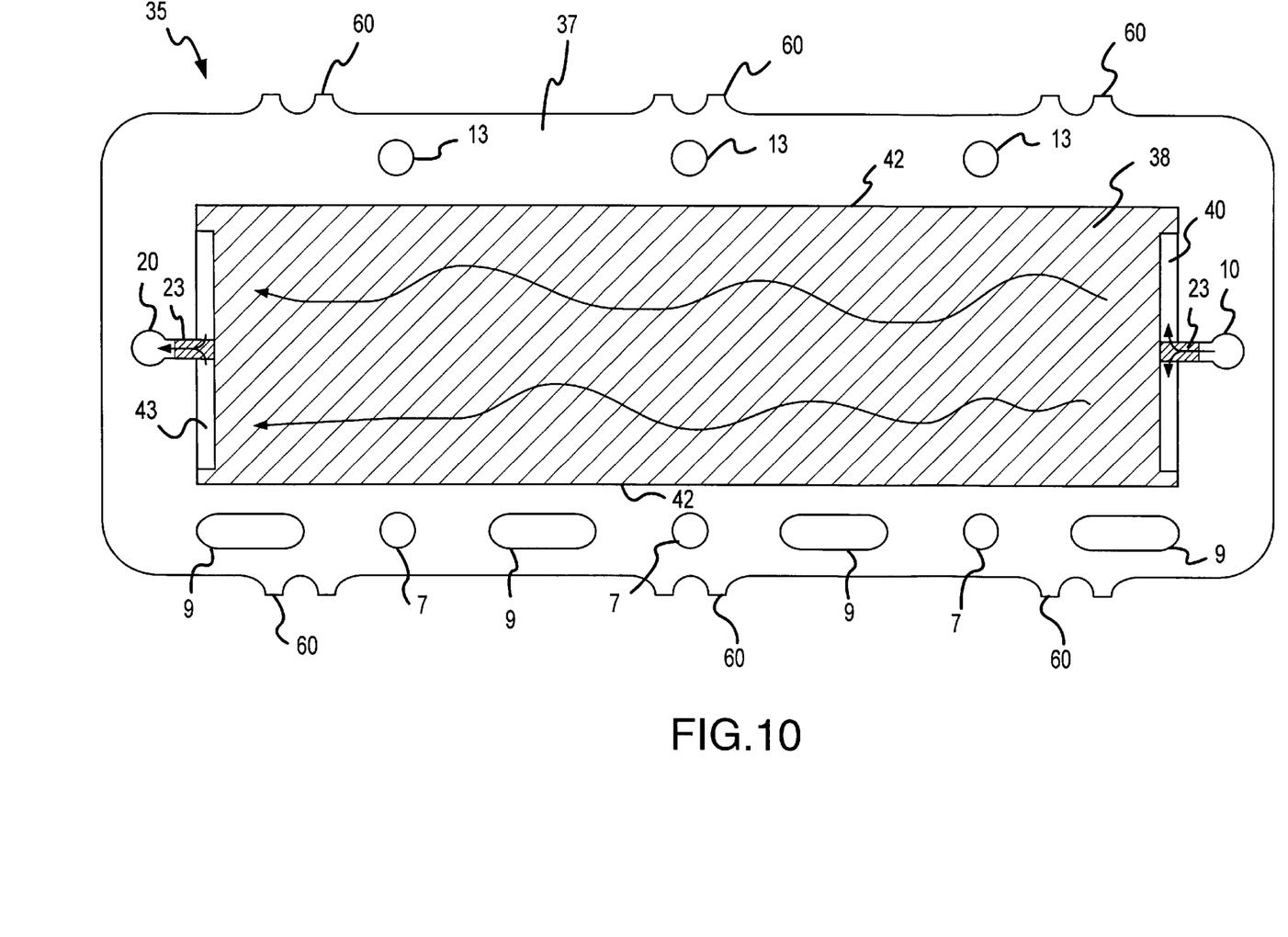
FIG. 10 is a front plan view of the anode electrode/gasket layer of the unit cell of FIG. 6.

Now turning to FIG. 10, a unit cell 15 contains an anode/gasket layer 35 which includes a gasket frame 37 and a porous anode electrode plate 38. The porous anode electrode plate 38 is made of a high porosity Carbon fiber paper (CFP). Preferably the pore sizes in the CFP are in the range of 0.005 to 0.015 inches diameter. Similar to the cathode plate, the porous electrode plate 38 is spaced apart from the gasket frame 37 along a side edge, to define a lateral inlet fuel distribution channel 40. The channel 40 is thus bounded by the gasket frame 37, the porous anode plate 38, the thin cooling layer 32, and the ion exchange membrane 34. Fuel is delivered to the lateral distribution channel 40 by a porous bridge 23, which provides connection to the longitudinal fuel inlet passage 10. The gasket frame 37 is slightly thicker than the porous anode plate 38 to ensure a positive seal between the gasket frame 37 and adjacent layers. In this way, fuel is constrained to pass through porous bridges 23 and into fuel inlet channel 40.

The anode plate 35 is sandwiched between the adjacent non-porous thin cooling layer 32 and the ion exchange membrane 34. Thus, porous plate 38 is sealed on opposing faces by cooling layer 32 and membrane 34, and along its long edges 42 by gasket layer 37, thereby constraining fuel entering the inlet channel 40 to pass through the porous electrode plate 38 along the long width of the cell. The thickness and porosity of the porous anode plate 38 is chosen such as to cause a greater restriction to flow than the restriction of the lateral inlet fuel distribution channel 40. Thus fuel disperses throughout channel 40 before entering porous electrode plate 38, providing uniform fuel distribution across the layer.

Similarly on the opposite edge of the cell, a lateral fuel collection channel 43 is formed via cooperation between the gasket frame 37, the porous anode plate 38, by the thin cooling layer 32, and the ion exchange membrane 34. The lateral fuel collection channel 43 delivers exhaust fuel to exit porous bridges 23 which connect to longitudinal fuel exhaust passage 20.

Alignment within unit cells is achieved during a modular assembly process. The unit cells 15 are conveniently assembled with desktop fixtures, which position the layers 32, 11, 34, 35 relative to one another, keying off of bolt notches 60 which surround the periphery of the stack. The unit cells are fixed, layer by layer, using an adhesive. Then the pre-assembled unit cells 15 can be inserted into the stack and alignment is achieved via the bolts 19 and mating bolt notches 60. Since the unit cells (and all other parts of the stack except the face plate and the end plate) are aligned via notches, cells can be inserted in the internal locations of the stack without having to first unstack the cell, as typically required with conventional fuel cell stacks.

In operation of the fuel cell, oxidant gas is introduced through inlet port 1, manifolding groove 5, and distributed along the bottom side of the active section 26 through inlet oxidant distribution passages 7. The oxidant gas then enters each individual cathode layer 12 through porous bridges 23 and inlet oxidant channel 30 along the bottom edge of the cathode layer. From there, the oxidant gas flows through the porous electrode plate 35 toward the top of the layer, where the remaining gas and reaction products, including condensed water, are collected in exhaust channel 33. High flow velocities are achieved in the porous plate 35 due to the relatively large pore sizes in the CFP, and resulting relatively low pressure drop from channel 30 to channel 33. The exhaust products then enter the exhaust passages 13 where they are carried out through manifolding groove 6 and outlet 2.

At the same time, fuel is introduced through inlet port 3 and distributed along one side of the active section 26 through fuel distribution passage 10. The fuel then enters each individual anode layer 35 through porous bridges 23 and inlet fuel channel 40 along a side edge of the anode layer. From there, the fuel flows through the porous electrode plate 38 to the opposite edge, where the remaining fuel and reaction products are collected in exhaust channel 43. Gasket layer 37 constrains the fuel to flow through the porous material and prevents leakage into the coolant or oxidant passages. The exhaust products then enter the exhaust passage 20 where they are carried out through outlet 4.

Heat is generated by the chemical reaction as the oxidant gas progresses from the bottom of porous plate 35 toward the top. Unlike conventional fuel cells, which utilize cooling jackets internal to the fuel cell stack, the fuel cell of the present invention uses the thin conductive plates 32 interposed between anode and cathode of adjacent cells to conduct out heat. In particular, heat generated by the cathode chemical reaction is conducted into the conductive plates 32, and conducted along the plate generally from top to bottom toward the heat sink provided by the cooling fluid in cooling passages 9. Thus by interposing coolant passages 9 with oxidant inlet passages 7 along the bottom side of the fuel cell stack 25, the waste heat is caused to flow from top to bottom of the stack, while oxidant gas flows from the bottom toward the top. As a result, the bottom side of the fuel cell, and thus the inlet oxidant gas as well, is maintained substantially cooler than the top side of the stack.

One skilled in the art will recognize the particular advantages obtained by providing such a preferred temperature distribution. More particularly, it is desirable to minimize the accumulation of condensed water in the cathode layer of the cell. In the fuel cell of the present invention, as the oxidant gas flows upward through the cathode plate, it also picks up moisture from the product water produced by the chemical reaction. Because of the above-described temperature gradient, the oxidant gas also increases in temperature as it moves upward. The increasing temperature reduces the tendancy for product water to condense out of the oxidant gas, and thus product water accumulation in the cathode plate is minimized.

The fuel cell stack construction of the present invention provides additional advantages. For one, the construction is relatively simple in that the unit cell only contains 4 layers and each layer can be manufactured in a punching or stamping type process. The use of multiple longitudinal coolant passages 9, and longitudinal oxidant passages 7 eliminates the conventional grooved backing plate approach, thus saving volume, weight, and cost. Also, as compared to conventional fuel cells that utilize thick, rigid electrode plates and/or thick rigid cooling jackets in each unit cell, the unit cells of the present invention are constructed of relatively thin, flexible layers.

For example, a preferred fuel cell stack producing 1500 watts of power, and having active section dimensions of 6 in. long, by 3 in. high, by 9 inches wide, includes 150 unit cells, each unit cell only 0.040 in. thick. In such a preferred unit cell, the anode and cathode layers 35, and 11 are preferably approximately 0.012 in.thick, and the heat conduction layer 32 approximately 0.012 in. thick. Thus the thin flexible layers of the present invention allow for a large number of unit cells in a compact space. Advantageously, weight densities (inverse of cell area density CAD) in the range of 0.5 to 1.0 lbm. per square foot of active area, and power density on the order of 2500 watts per kilogram are obtainable.

Although the subject invention is described herein in conjunction with the appended drawing figures, it will be appreciated that the invention is not limited to the specific form shown. Various modifications in the selection and arrangement of parts, components, and processing steps may be made in the implementation of the invention. These and other modifications may be made in the design and arrangement of the various components which implement the invention without departing from the spirit and scope of the invention as set forth in the appended claims.

What is claimed is:

1. An electro-chemical fuel cell stack comprising:

a plurality of unit fuel cells in stacked arrangement, each unit cell comprising a proton exchange membrane, an anode layer, a cathode layer and a heat conduction layer, said anode layer and said cathode layer each comprising a thin layer of a porous electrically conductive material;

at least one oxidant gas supply passage extending through said unit fuel cells along one side of said fuel cell stack, and adapted to supply oxidant gas to a first edge of said cathode layers and for subsequent flow of said oxidant gas through said porous material of said cathode layer toward a second, opposite side of said fuel cell stack; and at least one coolant fluid passage extending through said unit fuel cells along said one side of said fuel cell stack, said coolant passage in thermal contact with said conduction layers to draw heat through said conduction layers toward said coolant passage, wherein said proton exchange membrane, said anode layer, said cathode layer, and said heat conduction layer are relatively smooth and devoid of fluid channels.

2. The fuel cell stack of claim 1, wherein said at least one oxidant gas passage comprises a plurality of oxidant gas passages in substantially parallel arrangement, and said at least one coolant passage comprises a plurality of coolant passages in substantially parallel arrangement and interposed between said oxidant gas passages.

3. The fuel cell stack of claim 1, further comprising bus plates disposed at each end of said stack of unit cells, said bus plates serving as electrical terminals for connection of a load to said fuel cell.

4. The fuel cell stack of claim 3, further comprising:

rigid plates at each end of said fuel cell outward of said bus plates; and means for providing a clamping load against said rigid plates to compress together said rigid plates, said bus plates, and said unit fuel cells.

5. The fuel cell stack of claim 4, wherein said means for providing a clamping load comprises a strap wrapped around the outside of said fuel cell stack.

6. The fuel cell stack of claim 4, wherein said means for providing a clamping load comprises a plurality of bolts extending between said rigid plates for drawing said rigid plates toward each other.

7. The fuel cell of claim 1, further comprising rigid plates at each end of said fuel cell, said rigid plates including a plurality of apertures for introduction and removal of reactant gases and cooling fluid.

8. The fuel cell of claim 1, further comprising at least one rigid plate at an end of said stack, said rigid plate defining a fluid distribution groove on an inner face thereof, and a fluid port, said distribution groove in fluid communication with said fluid port and with at least one fluid passage in said fuel cell stack.

9. The fuel cell of claim 1, wherein said proton exchange membrane, said anode layer, said cathode layer, and said heat conduction layer are relatively thin and flexible.

10. The fuel cell of claim 1, wherein said cathode electrode has a short dimension and a long dimension, said flow of said oxidant gas from said first side of said fuel stack toward said second side of said fuel cell stack is along said short dimension.

11. The fuel cell stack of claim 1, wherein said long dimension is at least twice said short dimension.

12. The fuel cell stack of claim 1, further comprising at least one fuel gas supply passage extending through said unit fuel cells along a third side of said fuel cell stack, and adapted to supply fuel gas to a first edge of said anode layers and for subsequent flow of said fuel gas through said porous material of said anode layer toward a fourth, opposite side of said fuel cell stack.

13. The fuel cell stack of claim 1, wherein said conduction through said heat conduction layers provides for substantially all of the heat transport from said unit cells to said at least one coolant passage.

14. The fuel cell stack of claim 1, wherein said at least one coolant passage comprises cooperatively aligning holes formed in each of said layers of said fuel cell stack.

15. An electro-chemical fuel cell stack comprising:

a plurality of unit fuel cells in stacked arrangement, each unit cell comprising a proton exchange membrane, an anode layer, a cathode layer, and a heat conduction layer, said anode layer and said cathode layer each comprising a thin layer of a porous electrically conductive material;

at least one oxidant gas supply passage extending through said unit fuel cells along one side of said fuel cell stack, and adapted to supply oxidant gas to a first edge of said cathode layers and for subsequent flow of said oxidant gas through said porous material of said cathode layer toward a second, opposite side of said fuel cell stack; and at least one coolant fluid passage extending through said unit fuel cells along said one side of said fuel cell stack, said coolant passage in thermal contact with said conduction layers to draw heat through said conduction layers toward said coolant passage;

bus plates disposed at each end of said stack of unit cells, said bus plates serving as electrical terminals for connection of a load to said fuel cell;

rigid plates at each end of said fuel cell outward of said bus plates; and means for providing a clamping load against said rigid plates to compress together said rigid plates, said bus plates, and said unit fuel cells, wherein said rigid plates have an inner surface facing said fuel cells, the inner surface of at least one of said rigid plates defining a convex shape.

16. An electro-chemical fuel cell stack comprising:

a plurality of unit fuel cells in stacked arrangement, each unit cell comprising a proton exchange membrane, an anode layer, a cathode layer, and a heat conduction layer, said anode layer and said cathode layer each comprising a thin layer of a porous electrically conductive material;

at least one oxidant gas supply passage extending through said unit fuel cells along one side of said fuel cell stack, and adapted to supply oxidant gas to a first edge of said cathode layers and for subsequent flow of said oxidant gas through said porous material of said cathode layer toward a second, opposite side of said fuel cell stack; and at least one coolant fluid passage extending through said unit fuel cells along said one side of said fuel cell stack, said coolant passage in thermal contact with said conduction layers to draw heat through said conduction layers toward said coolant passage;

bus plates disposed at each end of said stack of unit cells, said bus plates serving as electrical terminals for connection of a load to said fuel cell;

rigid plates at each end of said fuel cell outward of said bus plates; and means for providing a clamping load against said rigid plates to compress together said rigid plates, said bus plates, and said unit fuel cells, wherein at least one of said rigid plates comprises a plurality of stiffening ribs disposed on a face thereof.

17. An electrochemical fuel cell stack comprising:

a plurality of unit fuel cells in stacked arrangement, each unit cell comprising a proton exchange membrane, an anode layer, a cathode layer, and a heat conduction layer, said anode layer and said cathode layer each comprising a thin layer of a porous electrically conductive material;

at least one oxidant gas supply passage extending through said unit fuel cells along one side of said fuel cell stack, and adapted to supply oxidant gas to a first edge of said cathode layers and for subsequent flow of said oxidant gas through said porous material of said cathode layer toward a second, opposite side of said fuel cell stack; and at least one coolant fluid passage extending through said unit fuel cells along said one side of said fuel cell stack, said coolant passage in thermal contact with said conduction layers to draw heat through said conduction layers toward said coolant passage, wherein said heat conduction layer is made of a carbon based material.

18. An electrochemical fuel cell stack comprising:

a plurality of unit fuel cells in stacked arrangement, each unit cell comprising a proton exchange membrane, an anode layer, a cathode layer, and a heat conduction layer, said anode layer and said cathode layer each comprising a thin layer of a porous electrically conductive material;

at least one oxidant gas supply passage extending through said unit fuel cells along one side of said fuel cell stack, and adapted to supply oxidant gas to a first edge of said cathode layers and for subsequent flow of said oxidant gas through said porous material of said cathode layer toward a second, opposite side of said fuel cell stack; and at least one coolant fluid passage extending through said unit fuel cells along said one side of said fuel cell stack, said coolant passage in thermal contact with said conduction layers to draw heat through said conduction layers toward said coolant passage, wherein said at least one coolant passage comprises a plurality of coolant passages, and said at least one oxidant gas supply passage comprises a plurality of oxidant gas supply passages, said coolant passages interposed between said oxidant gas passages.

19. A unit fuel cell for use in combination with a plurality of unit cells to form an electrochemical fuel cell stack, said unit fuel cell comprising:

a first electrode comprised of a substantially uniform thickness layer of a porous material suitable for passage of reactant gases therethrough, said first electrode having a gas inlet disposed along one edge and a gas outlet disposed along an opposite edge; and sealing members encasing the exterior of said first electrode to thereby define a confined path from said gas inlet, through said porous material, to said gas outlet.

20. The unit fuel cell of claim 19, wherein said sealing members comprise first and second gas impermeable fuel cell layers abutting opposing faces of said first electrode.

21. The unit fuel cell of claim 20, wherein said first impermeable layer includes a proton exchange membrane, and said second impermeable layer includes a thermally and electrically conductive plate.

22. The unit fuel cell of claim 21, wherein substantially all of the heat removal from said unit cell is by conduction through said conductive plate to a cooling fluid passage, and said conductive plate is relatively smooth and devoid of fluid channels.

23. The unit fuel cell of claim 22, wherein said cooling fluid passage comprises an aperture in said conductive plate positioned to cooperatively align with similarly located apertures in adjacent layers of said fuel cell stack.

24. The unit fuel cell of claim 22, wherein said heat conduction plate is made of a carbon based material.

25. The unit fuel cell of claim 20, wherein said sealing members further comprise a frame of a gasket material surrounding said porous material for sealing the edges thereof.

26. The unit fuel cell of claim 25, wherein said gas inlet comprises a channel formed alongside an edge of said porous material, said channel bounded by said edge of said porous material, said gasket material, said proton exchange membrane, and by said heat conduction layer.

27. The unit fuel cell of claim 19, further including a second electrode comprised of a substantially uniform thickness layer of a porous material, said second electrode sealingly abutting the side of said proton exchange membrane opposite said first electrode.

28. The unit fuel cell of claim 19, wherein said first electrode has a long dimension and a short dimension, said gas inlet and said gas outlet disposed along opposing short sides of said first electrode.

29. The unit fuel cell of claim 19, wherein said first electrode has a long dimension and a short dimension, said gas inlet and said gas outlet disposed along opposing long sides of said first electrode.

30. The unit fuel cell of claim 19, wherein said porous material comprises pore sizes in the range of 0.001 to 0.015 inches diameter.

31. The unit fuel cell of claim 19, wherein said first electrode is relatively smooth and devoid of fluid channels.

32. A method for distributing reactant gas through a unit cell in an electromechanical fuel cell stack, comprising the steps of:

providing a first electrode layer comprising a sheet of a porous electrically conductive material surrounded by a gasket material;

introducing a pressurized gas from a gas inlet passage to a gas inlet channel, said gas inlet channel extending along one side of said first electrode between said porous material and said gasket material; and flowing said pressurized gas from said gas inlet channel through said porous material substantially all the way across said porous material to an opposite side thereof.

33. The method of claim 32, further comprising the steps of:

collecting said pressurized gas in an exhaust gas channel, said exhaust gas channel extending along said opposite side of said porous material between said porous material and said gasket material; and flowing said exhaust gas from said exhaust gas channel to an exhaust gas passage.

34. The method of claim 32, wherein said electrode is substantially rectangular in shape, having opposing relatively short sides and opposing relatively long sides, said gas inlet and said gas outlet extending along said opposing relatively long sides of said electrode.

35. The method of claim 33, wherein said long sides are at least twice as long as said short sides.

36. The method of claim 32, wherein said inlet gas passage comprises cooperatively aligning apertures in all layers of said fuel cell stack.

37. An electrochemical fuel cell stack, comprising:

a plurality of unit cells in stacked arrangement, each unit cell formed of a plurality of layers;

rigid plates at each end of said stack of unit cells;

a plurality of substantially parallel cooling fluid passages extending through said stacked unit cells substantially the entire length of said fuel cell stack, said passages comprising cooperatively aligning holes in said layers of said unit cells;

grooves formed on the face of said rigid plates facing said unit cell stack, said grooves interconnecting said coolant passages to define a serial path through said passages from a single coolant inlet to a single coolant outlet.

38. The fuel cell stack of claim 37, wherein one of said end plates includes said cooling fluid inlet and said cooling fluid outlet.

39. The fuel cell stack of claim 37, further comprising an oxidant gas conduit system for delivering oxidant gas to cathode layers of said unit cells, said oxidant gas conduit system interposed with said coolant passages along said one side of said stack.

40. The fuel cell of claim 37, wherein at least one rigid plates defines a fluid distribution groove on an inner face thereof, and a fluid port, said distribution groove in fluid communication with said fluid port and with at least one fluid passage in said fuel cell stack.

41. The fuel cell stack of claim 37, wherein said rigid plates have an inner surface facing said fuel cells, the inner surface of at least one of said rigid plates defining a convex shape.

42. The fuel cell stack of claim 37, wherein at least one of said rigid plates comprises a plurality of stiffening ribs disposed on a face thereof.

* * * * *